(12) United States Patent
Huang et al.

(10) Patent No.: US 11,237,439 B1
(45) Date of Patent: Feb. 1, 2022

(54) DISPLAY PANEL AND DISPLAY DEVICE (71) Applicant: HUIZHOU CHINA STAR OPTOELECTRONICS DISPLAY CO., LTD., Huizhou (CN)

(72) Inventors: Dongchen Huang, Huizhou (CN); Min Wang, Huizhou (CN); Yuexia Lin, Huizhou (CN)

(73) Assignee: HUIZHOU CHINA STAR OPTOELECTRONICS DISPLAY CO., LTD., Huizhou (CN)

( * ) Notice: Subject to any disclaimer, the term of this patent is extended or adjusted under 35 U.S.C. 154(b) by 0 days.

(21) Appl. No.: 17/414,279

(22) PCT Filed: May 31, 2021

(86) PCT No.: PCT/CN2021/097121
§ 371 (c)(1),
(2) Date: Jun. 15, 2021

(30) Foreign Application Priority Data

May 7, 2021 (CN) .......................... 202110495090.6

(51) Int. Cl.
*G02F 1/1362* (2006.01)
*G02F 1/1368* (2006.01)
*G02F 1/13* (2006.01)

(52) U.S. Cl.
CPC ...... *G02F 1/136209* (2013.01); *G02F 1/1323* (2013.01); *G02F 1/1368* (2013.01); *G02F 1/136222* (2021.01)

(58) Field of Classification Search
None
See application file for complete search history.

(56) References Cited

U.S. PATENT DOCUMENTS

| 2019/0219870 A1* | 7/2019 | Nugraha | ................ G06F 21/84 |
| 2021/0232007 A1* | 7/2021 | Qiu | ...................... G02F 1/1368 |

* cited by examiner

*Primary Examiner* — Richard H Kim
(74) *Attorney, Agent, or Firm* — The Roy Gross Law Firm, LLC; Roy Gross (57) ABSTRACT

The present application provides a display panel and a display device; at least one first interval and at least one second interval are defined between a plurality of light-shielding patterns of a first substrate of the display panel, a plurality of color films with different colors are disposed in different ones of the first intervals respectively; and a light-shielding member is disposed on a second substrate and opposite to the second interval. The present application realizes an anti-peep function by disposing an anti-peep structure between the first substrate and the second substrate, so as to alleviate a problem of complicated stacking structure of a current anti-peep film.

20 Claims, 6 Drawing Sheets

DISPLAY PANEL AND DISPLAY DEVICE

CROSS REFERENCE TO RELATED APPLICATIONS

This application is a National Phase of PCT Patent Application No. PCT/CN2021/097121 having International filing date of May 31, 2021, which claims the benefit of priority of Chinese Patent Application No. 202110495090.6, filed May 7, 2021, the contents of which are all incorporated herein by reference in their entirety.

FIELD OF INVENTION

The present application relates to a field of display technology and more particularly to a display panel and a display device.

BACKGROUND OF INVENTION

With continuous development of display technology, a viewing angle of current display panel is becoming wider and wider. The viewing angle of the current display panel is close to 180 degrees. Users can watch content displayed on the display panel from various angles, basically realizing a viewing experience without blind spots. However, in public situation, an increased viewing angle also brings unnecessary trouble to privacy of users. An appearance of an anti-peep film has alleviated the problem. A viewable region of the anti-peep film is limited, so that when the display panel displays, a screen displayed by the display panel can only be read by the user, and others located beside the user can only see a dark display screen, which effectively protects the user's commercial secrets and/or personal privacy.

A traditional anti-peep film is usually hung on the display panel with an ultra-fine louver structure. Generally, the louver structure is disposed between two substrate layers, and the two substrate layers are covered with a protective layer, but such a stacked structure of the anti-peep film is relatively complex and costly.

Therefore, the technical problems of the complicated stack structure of the current anti-peep film needs to be solved.

SUMMARY OF INVENTION

The present application provides a display panel and a display device to alleviate the technical problem of the complicated stack structure of the current anti-peep film.

To alleviate the technical problem of the above-mentioned, the solutions of the present application are provided bellow:

The embodiments of the present application provide a display panel, including a first substrate, a second substrate disposed opposite to the first substrate, and liquid crystal molecules disposed between the first substrate and the second substrate, wherein the display panel further comprises:

a first light-shielding layer disposed on the first substrate and comprising a plurality of light-shielding patterns, wherein at least one first interval is defined between the plurality of light-shielding patterns;

a color film layer comprising a plurality of color films with different colors, wherein the color films with different colors are disposed in different ones of the first intervals respectively; and an anti-peep structure disposed between the first substrate and the second substrate, wherein the anti-peep structure comprises a portion of the light-shielding patterns and a portion of the liquid crystal molecules; and wherein the anti-peep structure further comprises a control member configured to control a deflection of the liquid crystal molecules positioned in the anti-peep structure, and when the display panel is in a non-anti-peep mode, the control member is configured to control the liquid crystal molecules in the anti-peep structure in an initial state, and light with a large viewing angle is blocked from transmitting through the display panel; when the display panel is in an anti-peep mode, the control member is configured to control the liquid crystal molecules in the anti-peep structure to deflect at a predetermined angle, and light with the large viewing angle transmits through the liquid crystal molecules and emits out from the display panel.

In the display panel of one embodiment of the present application, at least one second interval is further defined between the plurality of light-shielding patterns, and wherein the plurality of light-shielding patterns comprise a plurality of first light-shielding patterns and a plurality of second light-shielding patterns, the first interval is defined between one of the first light-shielding patterns and one of the second light-shielding patterns adjacent to the first light-shielding pattern, and/or between adjacent two of the plurality of the first light-shielding patterns, and the second interval is defined between adjacent two of the plurality of the second light-shielding patterns In the display panel of one embodiment of the present application, a width of the second interval is equal to a width of the first interval.

In the display panel of one embodiment of the present application, a width of the second interval is less than a width of the first interval.

In the display panel of one embodiment of the present application, a ratio of the width of the second interval to the width of the first interval ranges from 1:12 to 1:2.

In the display panel of one embodiment of the present application, a width of the second light-shielding pattern is less than or equal to a width of the first light-shielding pattern.

In the display panel of one embodiment of the present application, the color films with different colors comprises red color films, green color films, and blue color films, and wherein one of the red color films, one of the green color films, and one of the blue color films are sequentially disposed in adjacent three of the first intervals to form a pixel unit.

In the display panel of one embodiment of the present application, a number of the second intervals is equal to or less than a number of the pixel units.

In the display panel of one embodiment of the present application, the display panel further comprises thin film transistors disposed on the second substrate, and the thin film transistors and the light-shielding patterns are oppositely disposed.

In the display panel of one embodiment of the present application, the light-shielding member is disposed on a side of the thin film transistors away from the second substrate.

In the display panel of one embodiment of the present application, a material of the light-shielding member comprises a black matrix.

In the display panel of one embodiment of the present application, the light-shielding member is provided in a same layer as at least one of a gate electrode or a source and drain electrode of the thin film transistors.

In the display panel of one embodiment of the present application, a width of the light-shielding member is greater than or equal to the second interval.

The present application also provides a display device comprising a display panel, the display panel comprising a first substrate, a second substrate disposed opposite to the first substrate, and liquid crystal molecules disposed between the first substrate and the second substrate, wherein the display panel further comprises:

a first light-shielding layer disposed on the first substrate and comprising a plurality of light-shielding patterns, wherein at least one first interval is defined between the plurality of light-shielding patterns;

a color film layer comprising a plurality of color films with different colors, wherein the color films with different colors are disposed in different ones of the first intervals respectively; and an anti-peep structure disposed between the first substrate and the second substrate, wherein the anti-peep structure comprises a portion of the light-shielding patterns and a portion of the liquid crystal molecules; and wherein the anti-peep structure further comprises a control member configured to control a deflection of the liquid crystal molecules positioned in the anti-peep structure, and when the display panel is in a non-anti-peep mode, the control member is configured to control the liquid crystal molecules in the anti-peep structure in an initial state, and light with a large viewing angle is blocked from transmitting through the display panel; when the display panel is in an anti-peep mode, the control member is configured to control the liquid crystal molecules in the anti-peep structure to deflect at a predetermined angle, and light with the large viewing angle transmits through the liquid crystal molecules and emits out from the display panel.

In the display device of one embodiment of the present application, at least one second interval is further defined between the plurality of light-shielding patterns, and wherein the plurality of light-shielding patterns comprise a plurality of first light-shielding patterns and a plurality of second light-shielding patterns, the first interval is defined between one of the first light-shielding patterns and one of the second light-shielding patterns adjacent to the first light-shielding pattern, and/or between adjacent two of the plurality of the first light-shielding patterns, and the second interval is defined between adjacent two of the plurality of the second light-shielding patterns.

In the display device of one embodiment of the present application, the anti-peep structure further comprises a light-shielding member disposed on the second substrate and opposite to the second interval.

In the display device of one embodiment of the present application, the display panel further comprises thin film transistors disposed on the second substrate, and the thin film transistors and the light-shielding patterns are oppositely disposed.

In the display device of one embodiment of the present application, the light-shielding member is disposed on a side of the thin film transistors away from the second substrate.

In the display device of one embodiment of the present application, the light-shielding member is provided in a same layer as at least one of a gate electrode or a source and drain electrode of the thin film transistors.

In the display panel and the display device provided by the present application, a first light-shielding layer is disposed on a first substrate and includes a plurality of light-shielding patterns, wherein at least one first interval and at least one second interval are defined between the plurality of light-shielding patterns; a plurality of color films with different colors are disposed in different ones of the first intervals respectively; and a light-shielding member is disposed on the second substrate and opposite to the second interval; by multiplexing a portion of the light-shielding pattern of the first-light shielding layer as an anti-peep structure, and making the light-shielding member block the light that is incident perpendicularly, when the display panel is in a non-anti-peep mode, the liquid crystal molecules opposite to the second interval are in an initial state, and light with a large viewing angle is blocked and will not transmit through the second interval; when the display panel is in an anti-peep mode, the liquid crystal molecules opposite to the second interval are deflected by a predetermined angle, and light with the large viewing angle transmits through the liquid crystal molecules and emits out from the second interval, so as to realize free switching between the non-anti-peep mode and the anti-peep mode. At the same time, it is possible to integrate the anti-peep structure in the display panel and share the internal film structure of the display panel, thereby eliminating the need to use an external anti-peep film solution, saving costs, and solving the problem of complicated stacking structure of the current anti-peep film.

DESCRIPTION OF FIGURES

In order to explain the embodiments or the technical solutions in the prior art more clearly, the following will briefly introduce the figures that need to be used in the description of the embodiments or the prior art. Obviously, the figures in the following description are merely some embodiments of the present application. For those of ordinary skill in the art, they can obtain other figures based on these figures without inventive steps.

DETAILED DESCRIPTION OF EMBODIMENTS

The description of the following embodiments refers to the attached figures to illustrate specific embodiments that can be implemented in the present application. The directional terms mentioned in the present application, such as up, down, front, back, left, right, inner, outer, side, etc., are only for reference the direction of the accompany figures. Therefore, the directional terms used are used to illustrate and understand the present application, rather than to limit the present application. In the figure, units with similar structures are indicated by the same reference numerals. In the figures, a thickness of some layers and regions are exaggerated for clear understanding and ease of description. That is, a size and thickness of each component shown in the figures are arbitrarily shown, but the present application is not limited thereto.

Figure 1:
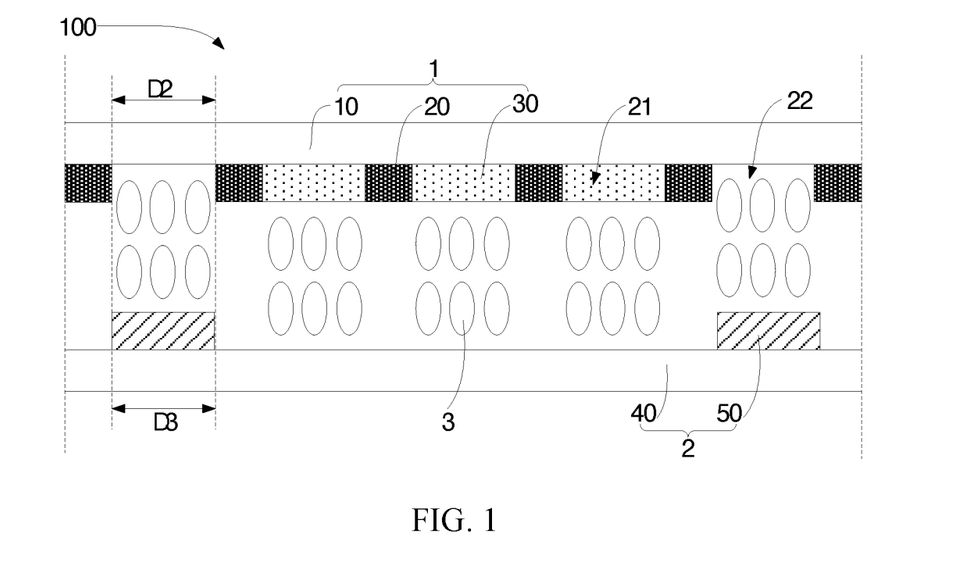
FIG. 1 is a schematic diagram of a cross-sectional structure of a display panel provided by one embodiment of the present application.
Figure 2:
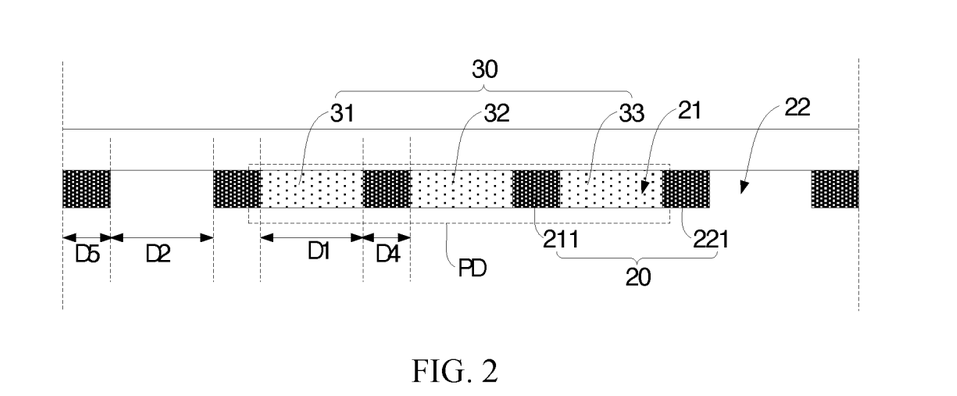
FIG. 2 is a detailed schematic diagram of a first substrate provided by one embodiment of the present application.
Figure 3:
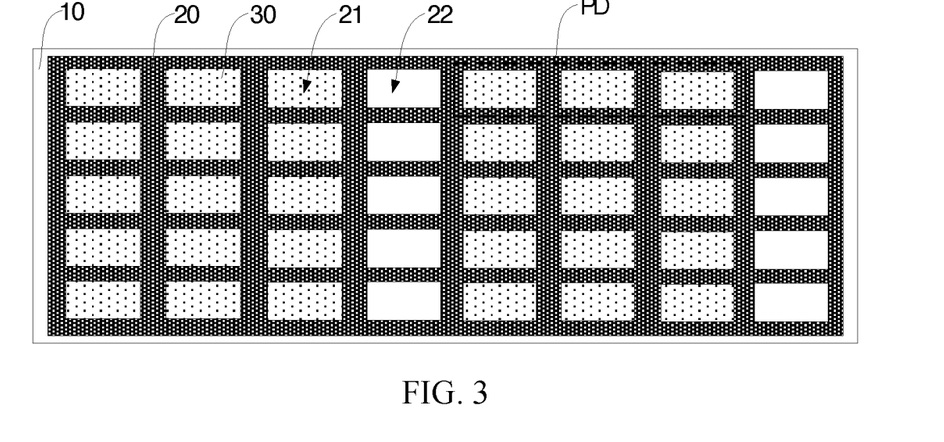
FIG. 3 is a schematic diagram of a top view structure of the display panel provided by one embodiment of the present application.

Please refer to FIG. 1 to FIG. 3. FIG. 1 is a schematic diagram of a cross-sectional structure of a display panel provided by one embodiment of the present application, FIG. 2 is a detailed schematic diagram of a first substrate provided by one embodiment of the present application, and FIG. 3 is a schematic diagram of a top view structure of the display panel provided by one embodiment of the present application. The display panel 100 is a liquid crystal display (LCD) panel, and the display panel 100 includes a first substrate 1 and a second substrate 2 disposed opposite to the first substrate 1, and liquid molecules 3 disposed between the first substrate 1 and the second substrate 2, wherein the first substrate 1 is a color filter substrate, and the second substrate 2 is an array substrate. Optionally, a separation distance between the first substrate 1 and the second substrate 2 ranges from 3 μm to 5 μm, and the separation distance between the first substrate 1 and the second substrate 2 is also a cell thickness of a liquid crystal cell of the display panel 100.

Specifically, the first substrate 1 includes a first base substrate 10, and a first light-shielding layer, a color film layer, and an anti-peep structure which are disposed on a side of the first base substrate 10 facing the second substrate 2, the first light-shielding layer includes a plurality of light-shielding patterns 20, wherein at least one first interval 21 and at least one second interval 22 are defined between the plurality of light-shielding patterns 20. The color film layer includes a plurality of color films 30 with different colors, wherein the plurality of color films 30 with different colors are disposed in different ones of the first intervals 21 respectively. The anti-peep structure is disposed between the first substrate 1 and the second substrate 2, wherein the anti-peep structure includes a portion of the light-shielding patterns 20, a portion of the liquid crystal molecules 3, and a light-shielding member 50.

Specifically, the second substrate 2 includes a second base substrate 40, and the light-shielding member 50 is disposed on a side of the second base substrate 40 facing the first substrate 1, wherein the light-shielding member 50 is disposed opposite to the second interval 22.

Optionally, both the first base substrate 10 and the second base substrate 40 may include rigid substrate such as a glass substrates and the like.

Optionally, a material of the first light-shielding layer includes light-shielding materials such as black matrix (BM), and the light-shielding patterns 20 of the first light-shielding layer is configured to shield light and prevent light leakage between the plurality of color films 30 with different colors.

The plurality of light-shielding patterns 20 include a plurality of first light-shielding patterns 211 and a plurality of second light-shielding patterns 221, the first interval 21 is defined between one of the first light-shielding pattern 211 and one of the second light-shielding pattern 221, and/or between adjacent two of the plurality of the first light-shielding patterns 211, and the second interval 22 is defined between adjacent two of the plurality of the second light-shielding patterns 221.

Optionally, a width D4 of the first light-shielding pattern 211 is equal to a width D5 of the second light-shielding pattern 221, that is, a size of the first light-shielding pattern 211 is the same as a size of the second light-shielding pattern 221, and forming the light-shielding pattern 20 with the same structure under a same condition can improve a practicability of a manufacturing process. Optionally, the width D4 of the first light-shielding pattern 211 and the width D5 of the second light-shielding pattern 221 both range from 10 μm to 20 μm. It should be noted that the width of each component described in the embodiments of the present application refers to a distance that each component extends in a horizontal direction.

Optionally, a width D1 of the first interval 21 is equal to a width D2 of the second interval 22, so that the plurality of first light shielding patterns 211 and the plurality of second light shielding patterns 221 are evenly distributed on the first substrate 1, and similarly, forming uniformly distributed light-shielding patterns 20 under a same process condition can improve the practicability of the manufacturing process and simplify a manufacturing process flow.

The plurality of color films 30 with different colors are disposed in different ones of the first intervals 21. The plurality of color film 30 with different colors includes red color films 31, green color films 32, and blue color films 33, wherein one of the red color films 31, one of the green color films 32, and one of the blue color films 33 are sequentially disposed in adjacent three of the first intervals 21 to form a pixel unit PD. The adjacent three of the first intervals 21 refer to the three first intervals 21 arranged in sequence, that is, the three first intervals 21 arranged sequentially between adjacent two second intervals 22.

The plurality of color films 30 with different colors are configured to transmit light of a specific wavelength, while filtering light of other wavelengths. For example, the red color film 31 can transmit light within a wavelength range of red light, while filtering light within a wavelength range of other colored light. That is, the light transmits through the red color film 31, the green color film 32, and the blue color film 33 to emit red light, green light, and blue light, respectively, to provide three primary colors of light of the pixel unit PD, so that each of the pixel units PD can display various colors. The display panel 100 includes a plurality of pixel units PD, so the display panel 100 can realize color display.

The plurality of color films 30 are not provided in the plurality of second intervals 22, and a number of the second intervals 22 is equal to a number of the pixel units PD, that is, each one of the pixel units PD is provided adjacent to one of the plurality of second intervals 22, and adjacent two pixel units PD are separated by one of the plurality of the second intervals 22, as shown in FIG. 3. Of course, the pixel unit PD of the embodiment of the present application is not limited to the pixel unit structure shown in FIG. 3, and the pixel unit PD shown in FIG. 3 only illustrates a correspondence between the second interval 22 and the pixel unit PD, and further, the number of the second intervals 22 may also be less than the number of the pixel units PD.

The light-shielding member 50 is disposed opposite to the second interval 22, and a width D3 of the light-shielding member 50 is equal to a width D2 of the second interval 22. The light-shielding member 50 is configured to shield light in a vertical direction from emitting out from the second interval 22, and the light-shielding member 50 is disposed on the second substrate 2.

Figure 4:
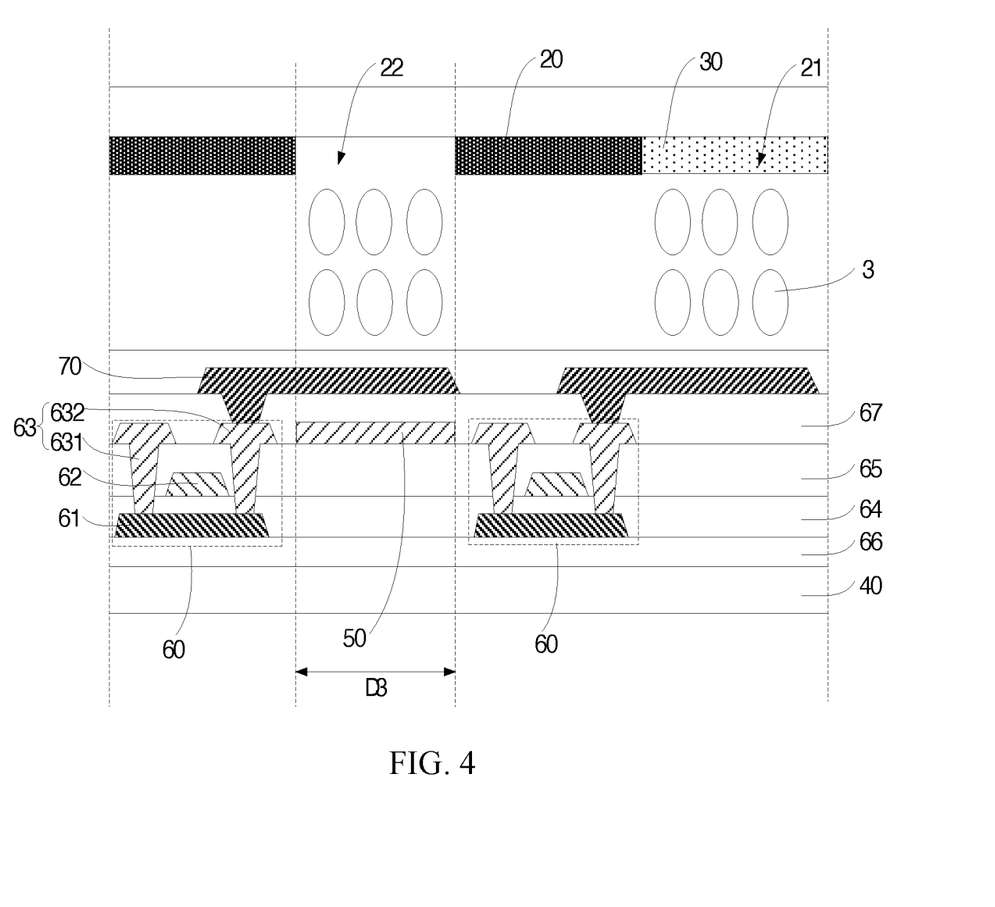
FIG. 4 is a schematic diagram of a cross-sectional structure of a second substrate provided by one embodiment of the present application.

The specific structure of the second substrate and the position of the light-shielding member will be explained in detail below:

Specifically, please refer to FIG. 4, FIG. 4 is a schematic diagram of a cross-sectional structure of the second substrate provided by one embodiment of the present application. The second substrate 2 further includes a thin film transistor (TFT) 60 disposed on the second base substrate 40 and a pixel electrode 70 electrically connected to the thin film transistor 60, wherein the thin film transistor 60 is disposed opposite to the light-shielding pattern 20, and the pixel electrode 70 is disposed opposite to the first interval 21 and the second interval 22. The light-shielding pattern 20 is configured to shield the light transmit through the thin film transistor 60 to prevent light leakage of the display panel 100.

The thin film transistor 60 is configured to drive the pixel electrode 70 to control a deflection of the liquid crystal molecules 3 of the corresponding pixel, so as to realize the transmission or blockage of light. Of course, in order to control the deflection of the liquid crystal molecules 3, the display panel 100 also needs to be provided with a common electrode (not shown), wherein an electric field is formed between the pixel electrode 70 and the common electrode to control the deflection of the liquid crystal molecules 3. The specific arrangement of the common electrode depends on the display mode of the display panel 100. For example, when the display panel 100 adopts an in-plane switching (IPS) display mode, the common electrode and the pixel electrode 70 are disposed on the second substrate 2 so that a horizontal electric field is formed between the common electrode and the pixel electrode 70.

The pixel electrode 70 disposed opposite to the second interval 22 and the thin film transistor 60 electrically connected to the pixel electrode 70 constitute a control member to control the deflection of the liquid crystal molecules 3 opposite to the second interval 22.

Optionally, the thin film transistor 60 includes an active layer 61, a gate electrode 62, and a source and drain electrode 63 stacked on the second base substrate 40. Of course, the second substrate 2 is further provided with an insulating layer between the active layer 61, the gate electrode 62, and the source and drain electrode 63. For example, a gate insulating layer 64 is disposed between the active layer 61 and the gate electrode 62, and an interlayer insulating layer 65 is disposed between the gate electrode 62 and the source and drain electrode 63. It should be noted that the structure of the thin film transistor 60 in the embodiment of the present application is not limited to this, and the embodiment of the present application only uses the structure of the thin film transistor 60 shown in FIG. 4 as an example for description.

Optionally, a buffer layer 66 is further disposed between the active layer 61 and the second base substrate 40, and the buffer layer 66 can prevent undesired impurities or pollutants (such as moisture, oxygen, etc.) diffusing from the second base substrate 40 into devices that may be damaged by these impurities or contaminants, and at the same time, the buffer layer 66 also provides a flat top surface.

The active layer 61 is disposed on the buffer layer 66. The active layer 61 includes a channel region, and a source doped region and a drain doped region which are positioned on both sides of the channel region.

The gate insulating layer 64 covers the active layer 61 and the buffer layer 66, and the gate electrode 62 is disposed on the gate insulating layer 64, wherein the gate electrode 62 and the channel region of the active layer 61 are oppositely disposed. Optionally, the gate electrode 62 is formed by patterning a laminated metal of molybdenum (Mo), aluminum (Al), and molybdenum (Mo), and wherein the laminated metal of molybdenum (Mo), aluminum (Al), and molybdenum (Mo) is not transparent.

The interlayer insulating layer 65 covers the gate electrode 62 and the gate insulating layer 64, and the source and drain electrode 63 is disposed on the interlayer insulating layer 65. The source and drain electrode 63 includes a source electrode 631 and a drain electrode 632, wherein the source electrode 631 is connected to the source doped region by a first through hole of the interlayer insulating layer 65, and the drain electrode 632 is connected to the drain doped region by the second through hole of the interlayer insulating layer 65. Optionally, the source and drain electrode 63 is also formed by patterning molybdenum (Mo), aluminum (Al), and molybdenum (Mo) laminated metals, and wherein the laminated metals of molybdenum (Mo), aluminum (Al), and molybdenum (Mo) are not transparent.

Optionally, the light-shielding member 50 is provided in a same layer as at least one of the gate electrode 62 or the source and drain electrode 63 of the thin film transistor 60, wherein the light-shielding member 50 is also made of patterned opaque molybdenum (Mo), aluminum (Al), and molybdenum (Mo) laminated metal to achieve the light-shielding function. Specifically, in the embodiment of the present application, the light-shielding member 50 and the source and drain electrode 63 are disposed in the same layer as an example. As shown in FIG. 4, the light-shielding member 50 is formed when the source and drain electrode 63 of the thin film transistor 60 is formed, and the light-shielding member 50 is disposed opposite to the pixel electrode 70.

It should be noted that the "disposed in a same layer" in the embodiments of the present application means that in the manufacturing process, the film layer formed of the same material is patterned to obtain at least two different features, then the at least two different features are disposed on a same layer. For example, the light-shielding member 50 and the source and drain electrode 63 of the thin film transistor 60 of this embodiment are obtained by patterning the same opaque molybdenum (Mo), aluminum (Al), and molybdenum (Mo) laminated metal, and the light-shielding member 50 and the source and drain electrode 63 of the thin film transistor 60 are disposed in the same layer.

Furthermore, the second substrate 2 further includes a passivation layer 67 disposed on the thin film transistor 60, and a pixel electrode 70 disposed on the passivation layer 67. Specifically, the passivation layer 67 covers the source electrode 631, the drain electrode 632, and the light-shielding member 50, wherein the pixel electrode 70 is electrically connected to the source electrode 631 or the drain electrode 632 by a through hole of the passivation layer 67. As shown in FIG. 4, the pixel electrode 70 is electrically connected to the drain electrode 632, wherein the pixel electrode 70 is also disposed opposite to the first interval 21 and the second interval 22. Of course, a width of the pixel electrode 70 is greater than a width of the first interval 21 and a width of the second interval 22.

The pixel electrode 70 is a transparent electrode, and the pixel electrode 70 may be formed of, for example, indium tin oxide (ITO) or indium zinc oxide (IZO). However, the pixel electrode 70 is not limited thereto, and the pixel electrode 70 may be formed of various transparent conductive materials, and may also be formed in a single-layer structure or a multi-layer structure.

Of course, both the first substrate 1 and the second substrate 2 further include an alignment layer disposed on a top surface of the substrate, wherein the top surface of the substrate means an uppermost layer of the first substrate 1 facing the liquid crystal molecules 3 and an uppermost layer of the second substrate 2 facing the liquid crystal molecules 3. The alignment layer is configured to align the liquid crystal molecules 3, and since the alignment layer is not an important invention of the present application, it will not be repeated here.

The pixel electrode 70 and the light-shielding member 50 are both disposed opposite to the second interval 22, and the plurality of color films 30 are not disposed in the plurality of second interval 22, so a region opposite to the second interval 22 cannot be used for displaying the image. In one embodiment of the present application, the region opposite to the second interval 22 is configured to be an anti-peep region to realize the anti-peep function. The anti-peep region includes the plurality of second light shielding patterns 221 which form the plurality of second interval 22, the liquid crystal molecules 3, the light-shielding member 50, the thin film transistor 60, and the pixel electrode 70, etc., wherein the liquid crystal molecules 3, the thin film transistor 60, and the pixel electrode 70 in the anti-peep region is the same as the liquid crystal molecules 3, the thin film transistor 60, and the pixel electrode 70 in the pixel unit PD.

Figure 5:
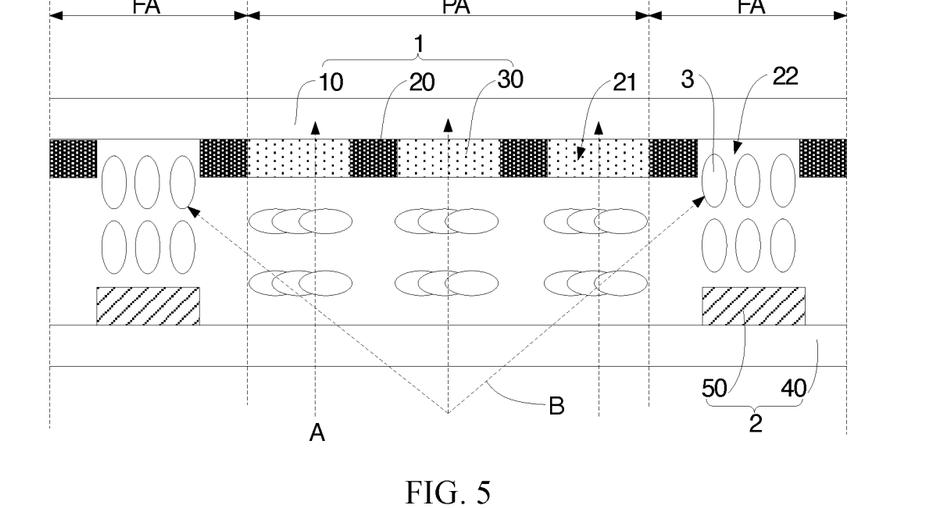
FIG. 5 is a schematic diagram of a cross-sectional structure of the display panel with an anti-peep function turned off according to one embodiment of the present application.
Figure 6:
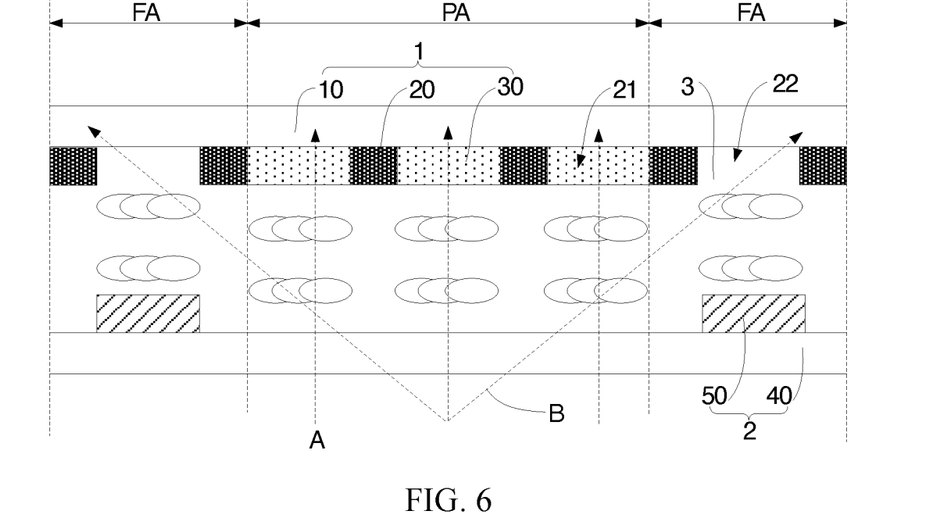
FIG. 6 is a schematic diagram of a cross-sectional structure of the display panel with the anti-peep function turned on according to one embodiment of the present application.

The implementation principle of the anti-peep function of the display panel 100 will be described in detail below:

Please refer to FIGS. 1 to 6 in combination. FIG. 5 is a schematic diagram of a cross-sectional structure of the display panel with an anti-peep function turned off according to one embodiment of the present application, and FIG. 6 is a schematic diagram of a cross-sectional structure of the display panel with the anti-peep function turned on according to one embodiment of the present application. As shown in FIG. 5, the display panel 100 is in a state when the anti-peep function is turned off, that is, the display panel 100 is in a non-anti-peep mode, and the liquid crystal molecules 3 opposite to the second interval 22 are in an initial state. The liquid crystal molecules 3 opposite to the pixel unit PD are deflected by a predetermined angle to allow light to transmits through the color films 30 of the pixel unit PD to realize image display.

It should be noted that the initial state of the liquid crystal molecules 3 refers to a standing state of the liquid crystal molecules 3 without a force of an electric field, that is, an original state of the liquid crystal molecules 3 after alignment, wherein in the initial state light cannot be transmitted. Optionally, when the liquid crystal molecules 3 are in the initial state, a long axis direction of the liquid crystal molecules 3 is parallel to a horizontal direction, or the long axis direction of the liquid crystal molecules 3 is parallel to a vertical direction, specifically, an arrangement direction of the liquid crystal molecules 3 in the initial state depends on a display mode of the display panel 100 and a type of the liquid crystal molecules 3. In this embodiment of the present application, an arrangement state in which the long axis direction of the liquid crystal molecules 3 is parallel to the vertical direction is the initial state.

In addition, when the liquid crystal molecules 3 are subjected to an electric field force, the liquid crystal molecules 3 are deflected to a predetermined angle to allow light to transmit through. The predetermined angle refers to an angle which the liquid crystal molecules 3 deflected allow light to transmit through. Optionally, the predetermined angle in the embodiment of the present application is 90 degrees, that is, the liquid crystal molecules 3 are arranged horizontally after being deflected by the predetermined angle from the vertical arrangement of the initial state.

Specifically, when the display panel 100 is in a non-anti-peep protection mode, in the pixel region PA (for convenience of description, the pixel region PA is also a region opposite to the pixel unit PD), the incident light to the display panel 100 includes a first light A and a second light B. The first light A is incident perpendicularly to the display panel, and the second light B is incident at a larger incident angle to the display panel. Of course, the light incidents directed to the display panel 100 include various directions, and the embodiment of the present application selectively takes the first light A and the second light B for examples.

At this time, the thin film transistor 60 of the pixel region PA operates to provide a driving signal to the pixel electrode 70 to form an electric field between the pixel electrode 70 and the common electrode, and the liquid crystal molecules 3 are deflected by the predetermined angle from the initial state of the vertical arrangement to the horizontal arrangement under the effect of the electric field force. The first light A transmits through the liquid crystal molecules 3 and emits out from the color film 30 of the pixel region PA to realize the image display of the display panel 100.

At the same time, in the corresponding anti-peep region FA (for convenience of description, the anti-peep region FA is also a region corresponding to the anti-peep structure), due to a presence of the light-shielding member 50, the light directed to the display panel 100 cannot transmit through the light-shielding member 50. However, the second light B of the pixel region PA transmit through the liquid crystal molecules 3 of the pixel region PA and direct toward the liquid crystal molecules 3 of the anti-peep region FA. At this time, the thin film transistor 60 in the anti-peep region FA does not operate, and the opposite pixel electrode 70 does not generate the electric field. Accordingly, the liquid crystal molecules 3 in the anti-peep region FA will not be deflected. In this way, the liquid crystal molecules 3 in the anti-peep region FA are in the initial state of vertical arrangement. Therefore, although the second light B is directed to the liquid crystal molecules 3 in the anti-peep region FA, it will be blocked by the liquid crystal molecules 3 in the anti-peep region FA. At this time, no light will be emitted out from the second interval 22, that is, it will not affect the viewing of the display panel 100 at the large viewing angle, so that the display panel 100 is in a sharing mode, and the screen displayed on the display panel 100 can be seen regardless of whether it is viewed from a front or from a side.

As shown in FIG. 6, the display panel 100 is in a state with the anti-peep function turned on, that is, the display panel 100 is in the anti-peep mode. At this time, the liquid crystal molecules 3 in the pixel region PA are deflected by the predetermined angle to allow the light transmit through the color film 30 of the pixel region PA to realize image display, and the liquid crystal molecules 3 opposite to the second interval 22 are also deflected by the predetermined angle to allow the light to transmit through and emit out from the second interval 22 to realize the anti-peep function.

Specifically, when the display panel 100 is in the anti-peep mode, the display state of the pixel region PA is the same as in the non-anti-peep mode, that is, the light of the pixel region PA transmits through the liquid crystal molecules 3 and emits out from the color film 30 to realize the screen display of the display panel 100. However, in the anti-peep region FA, the thin film transistor 60 in the anti-peep region FA also operates to provide a driving signal to the pixel electrode 70 to form the electric field between the pixel electrode 70 and the common electrode, and the liquid crystal molecules 3 are deflected by the predetermined angle from the initial state of the vertical arrangement to the horizontal arrangement under the effect of the electric field force, so that an arrangement of the liquid crystal molecules 3 of the anti-peep region FA is the same as an arrangement of the liquid crystal molecules 3 of the pixel region PA.

At this time, the second light B transmits through the liquid crystal molecules 3 of the pixel region PA and is directed to the liquid crystal molecules 3 in the anti-peep region FA, and because the liquid crystal molecules 3 in the anti-peep region FA are also deflected to the horizontal arrangement, light is allowed to transmit through. Then the second light B transmits through the liquid crystal molecules 3 in the anti-peep region FA and emits out from the second interval 22. In this way, when viewing the display panel 100 at the large viewing angle, the light emitted out from the second interval 22 can be seen, but the screen displayed on the display panel 100 cannot be viewed, so as to realize the anti-peep function. At the same time, under the front view angle, due to a presence of the light-shielding member 50 of the anti-peep region FA, the vertical direction of light will be blocked from emitting out of the second interval 22, so it will not affect viewing of the image displayed by the display panel 100 from the front view angle.

In this embodiment, by multiplexing the light-shielding pattern 20 on the first substrate 1, and providing the light-shielding member 50 on the second substrate 2, the anti-peep function of the display panel 100 is realized. At the same time, it cooperates with the liquid crystal molecules 3 to transmit light and block light, so that the display panel 100 can switch freely between the anti-peep mode and the non-anti-peep mode. Therefore, there is no need to use the solution of an external anti-peep film, thereby improving an integration of the display panel 100, reducing a thickness of the display panel 100, saving the cost of the display panel 100, and solving the problem of the complicated stacking structure of the current anti-peep film.

Figure 7:
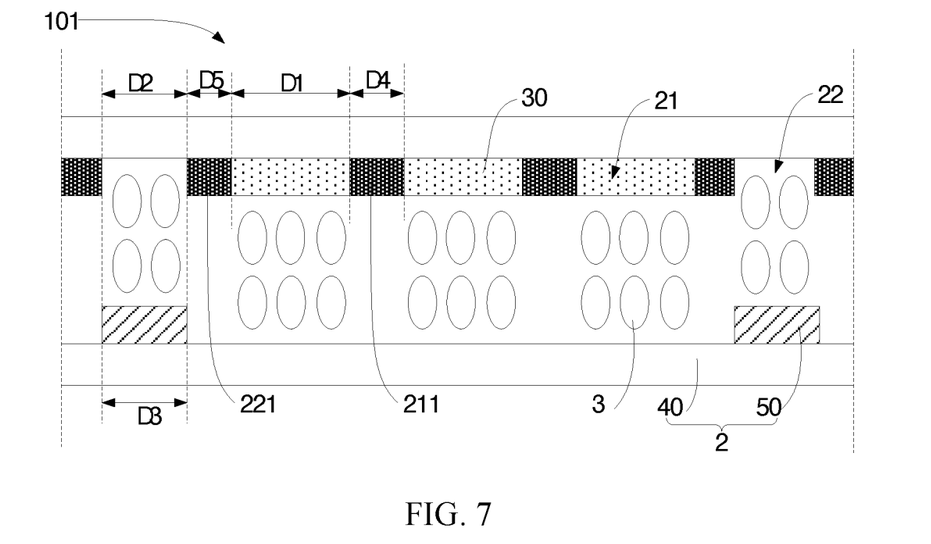
FIG. 7 is a schematic diagram of another cross-sectional structure of the display panel provided by one embodiment of the present application.
Figure 8:
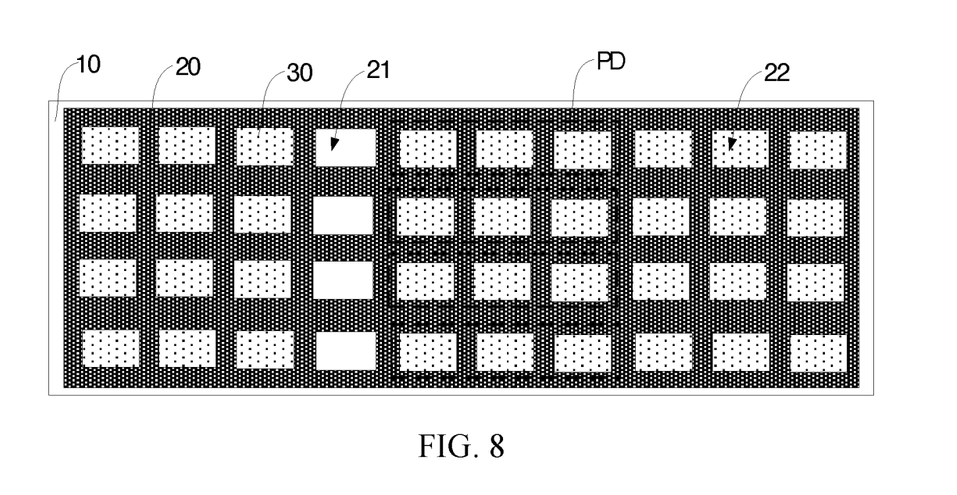
FIG. 8 is a schematic diagram of another top view of structure of the display panel provided by one embodiment of the present application.

In one embodiment, please refer to FIG. 7 and FIG. 8. FIG. 7 is a schematic diagram of another cross-sectional structure of the display panel provided by one embodiment of the present application, and FIG. 8 is a schematic diagram of another top view of structure of the display panel provided by one embodiment of the present application. A difference from the foregoing embodiment is that a width D1 of the first interval 21 formed by the first light-shielding patterns 211 of the display panel 101 is greater than a width D2 of the second interval 22 formed by the second light-shielding patterns 221, so as to improve a transmittance of the display panel 101

Specifically, a ratio of the width D2 of the second interval 22 to the width D1 of the first interval 21 ranges from 1:12 to 1:2. By reducing the width D2 of the second interval 22, the area of the display region of the display panel 101 occupied by the anti-peep region can be reduced, thereby improving the transmittance of the display panel 101.

Optionally, referring to FIG. 8, a number of the second intervals 22 is less than a number of the pixel units PD, that is, the plurality of second intervals 22 are disposed between a portion of adjacent pixel units PD. A smaller number of the second intervals 22 are provided to reduce the region of the display region of the display panel 101 occupied by the anti-peep region, thereby improving the transmittance of the display panel 101.

Optionally, a width D5 of the second light-shielding pattern 221 is less than a width D4 of the first light-shielding pattern 211, which can further reduce the area of the display region of the display panel 101 occupied by the anti-peep region, and thereby improving the transmittance of the display panel 101.

Further, the light-shielding member 50 and the gate electrode of the thin film transistor on the second substrate 2 are disposed in the same layer, which can also achieve the function of shielding light in the vertical direction. For other descriptions, please refer to the above-mentioned embodiment, which will not be repeated here.

Figure 9:
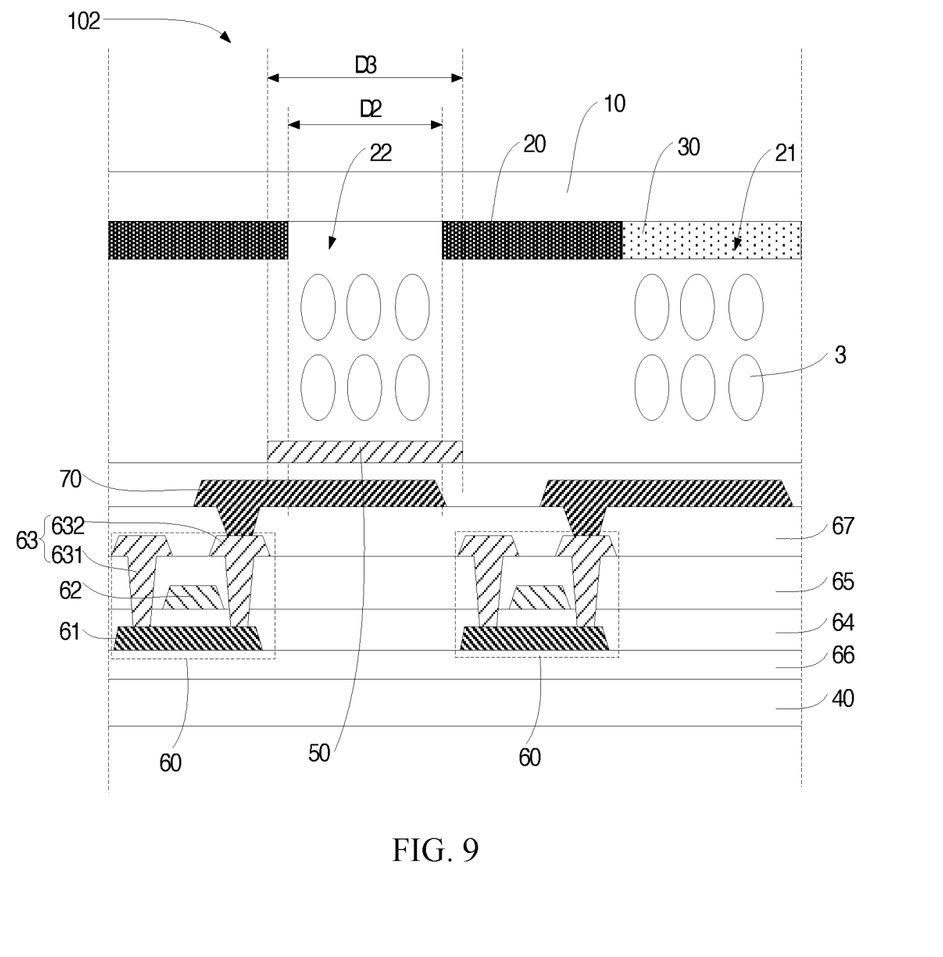
FIG. 9 is a schematic diagram of yet another cross-sectional structure of the display panel provided by the present application.

In one embodiment, please refer to FIG. 9, FIG. 9 is a schematic diagram of yet another cross-sectional structure of the display panel provided by the present application. A difference from the foregoing embodiment is that the light-shielding member 50 of the display panel 102 is disposed on a side of the thin film transistor 60 away from the second base substrate 40, that is, the light-shielding member 50 is separately formed on the film layer above the thin film transistor 60; optionally, the light-shielding member 50 may be separately disposed between the thin film transistor 60 and the pixel electrode 70 or separately disposed above the pixel electrode 70, but the present application is not limited thereto. The light-shielding member of the present application can also be separately disposed between other film layers on the second substrate. In the embodiment of the present application, the light-shielding member 50 is provided above the pixel electrode 70 as an example.

Optionally, the width D3 of the light-shielding member 50 is greater than the width D2 of the second interval 22, so that the light-shielding member 50 achieves better shielding performance, so as to prevent the light leakage of a position of second interval 22. Optionally, a material of the light-shielding member 50 includes light-shielding materials with light-shielding properties such as black matrix and black metal. For other descriptions, please refer to the above-mentioned embodiment, which will not be repeated here.

Figure 10:
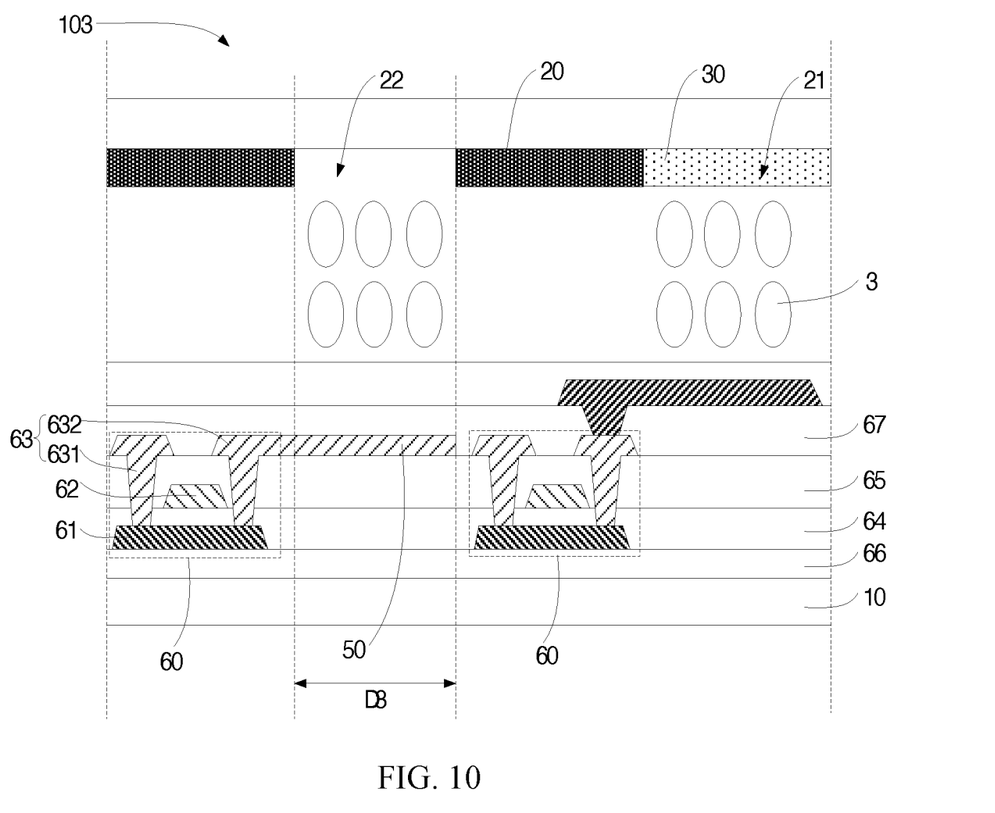
FIG. 10 is a schematic diagram of still another cross-sectional structure of the display panel provided by the present application.

In one embodiment, please refer to FIG. 10, FIG. 10 is a schematic diagram of still another cross-sectional structure of the display panel provided by the present application. A difference from the foregoing embodiment is that the light-shielding member 50 of the display panel 103 is electrically connected to a corresponding thin film transistor 60 to form a control member to control the deflection of the liquid crystal molecules 3 opposite to the second interval 22. Therefore, there is no need to dispose pixel electrodes in the region opposite to the second interval 22.

Optionally, the light-shielding member is disposed in a same layer as the source and drain electrode 63 of the thin film transistor, and the light-shielding member 50 is electrically connected to a source electrode 631 or a drain electrode 632 of the source and drain electrode 63. The embodiment of the present application uses the electrical connection between the light-shielding member 50 and the drain 632 as an example for description. The thin film transistor 60 provides a driving signal to the light-shielding member 50 to form the electric field between the light-shielding member 50 and the common electrode of the display panel 103 to control the deflection of the liquid crystal molecules 3 opposite to the second interval 22.

The light-shielding member 50 in this embodiment is not only configured to shield light, but also multiplexed as a part of the control member to control the deflection of the liquid crystal molecules 3 opposite to the second interval 22, to realize free switching of the anti-peep mode and the sharing mode of the display panel 103, and there is no need to dispose pixel electrodes in the region opposite to the second interval 22, which saves the material for disposing the pixel electrodes, thereby saving cost and simplifying the manufacturing process. For other descriptions, please refer to the above-mentioned embodiment, which will not be repeated here.

Figure 11:
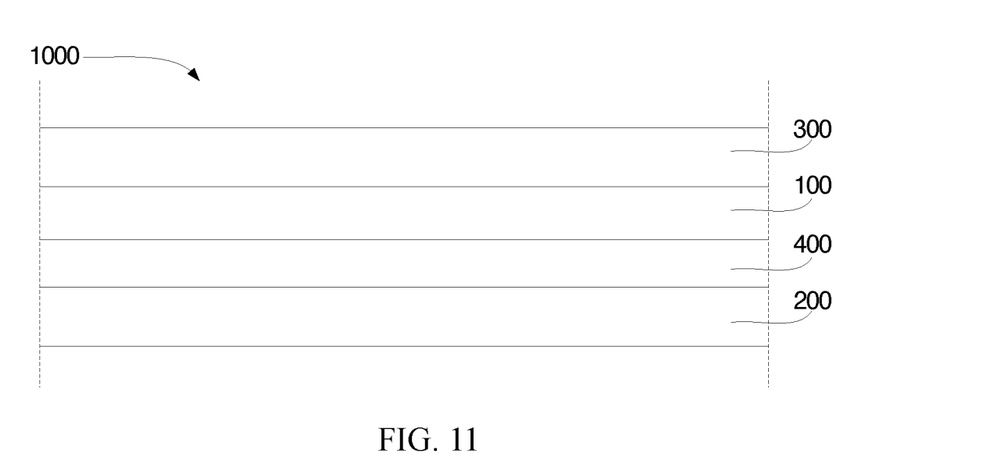
FIG. 11 is a schematic cross-sectional structure diagram of a display device provided by one embodiment of the present application.

In one embodiment, please refer to FIG. 11, FIG. 11 is a schematic cross-sectional structure diagram of a display device provided by one embodiment of the present application. The display device includes the display panel of one of the foregoing embodiments. In the embodiment of the present application, the display device 1000 includes the display panel 100 as an example.

Specifically, the display device 1000 includes a display panel 100, a backlight module 200 disposed opposite to the display panel 100, an upper polarizer 300 attached to a side of the display panel 100 away from the backlight module 200, and a lower polarizer 400 attached to a side of the display panel 100 facing the backlight module 200. Of course, the display device 1000 further includes a circuit board and other devices bound to the display panel 100, a cover plate covering the display panel 100, and the like.

According to the above embodiment, it can be known:

The present application provides a display panel and a display device. The display panel includes a first substrate, a second substrate disposed opposite to the first substrate, and liquid crystal molecules disposed between the first substrate and the second substrate. A first light-shielding layer is disposed on a first substrate and includes a plurality of light-shielding patterns, wherein at least one first interval and at least one second interval are defined between the plurality of light-shielding patterns; a plurality of color films with different colors are disposed in different ones of the first intervals respectively; and a light-shielding member is disposed on the second substrate and opposite to the second interval; by multiplexing a portion of the light-shielding pattern of the first-light shielding layer as an anti-peep structure, and making the light-shielding member block the light that is incident perpendicularly, when the display panel is in a non-anti-peep mode, the liquid crystal molecules opposite to the second interval are in an initial state, and light with a large viewing angle is blocked and will not transmit through the second interval; when the display panel is in an anti-peep mode, the liquid crystal molecules opposite to the second interval are deflected by a predetermined angle, and light with the large viewing angle transmits through the liquid crystal molecules and emits out from the second interval, so as to realize free switching between the non-anti-peep mode and the anti-peep mode. At the same time, it is possible to integrate the anti-peep structure in the display panel and share the internal film structure of the display panel, thereby eliminating the need to use an external anti-peep film solution, saving costs, and solving the problem of complicated stacking structure of the current anti-peep film.

In the above-mentioned embodiments, the description of each embodiment has its own emphasis. For parts that are not described in detail in one embodiment, reference may be made to related descriptions of other embodiments.

The embodiments of the present application are described in detail above, and specific embodiments are used in this specification to explain the principles and implementations of the present application. The descriptions of the above embodiments are only used to help understand the technical solutions and core ideas of the present application. Those of ordinary skill in the art should understand: It is still possible to modify the technical solutions described in the foregoing embodiments, or equivalently replace some of the technical features; and these modifications or replacements do not cause an essence of the corresponding technical solutions to deviate from a scope of the technical solutions of the embodiments of the present application.

What is claimed is:

1. A display panel, comprising a first substrate, a second substrate disposed opposite to the first substrate, and liquid crystal molecules disposed between the first substrate and the second substrate, wherein the display panel further comprises:
   a first light-shielding layer disposed on the first substrate and comprising a plurality of light-shielding patterns, wherein at least one first interval is defined between the plurality of light-shielding patterns;
   a color film layer comprising a plurality of color films with different colors, wherein the plurality of color films with different colors are disposed in different ones of the first intervals respectively; and
   an anti-peep structure disposed between the first substrate and the second substrate, wherein the anti-peep structure comprises a portion of the light-shielding patterns and a portion of the liquid crystal molecules; and
   wherein the anti-peep structure further comprises a control member configured to control a deflection of the liquid crystal molecules positioned in the anti-peep structure, and when the display panel is in a non-anti-peep mode, the control member is configured to control the liquid crystal molecules in the anti-peep structure in an initial state, and light with a large viewing angle is blocked from transmitting through the display panel; when the display panel is in an anti-peep mode, the control member is configured to control the liquid crystal molecules in the anti-peep structure to deflect at a predetermined angle, and light with the large viewing angle transmits through the liquid crystal molecules and emits out from the display panel.

2. The display panel according to claim 1, wherein at least one second interval is further defined between adjacent two of the plurality of light-shielding patterns, and wherein the plurality of light-shielding patterns comprise a plurality of first light-shielding patterns and a plurality of second light-shielding patterns, the first interval is defined between one of the first light-shielding patterns and one of the second light-shielding patterns adjacent to the first light-shielding pattern, and/or between adjacent two of the plurality of first light-shielding patterns, and the second interval is defined between adjacent two of the plurality of second light-shielding patterns.

3. The display panel according to claim 2, wherein the anti-peep structure further comprises a light-shielding member disposed on the second substrate and opposite to the second interval.

4. The display panel according to claim 3, wherein a width of the second interval is equal to a width of the first interval.

5. The display panel according to claim 3, wherein a width of the second interval is less than a width of the first interval.

6. The display panel according to claim 5, wherein a ratio of the width of the second interval to the width of the first interval ranges from 1:12 to 1:2.

7. The display panel according to claim 3, wherein a width of the second light-shielding pattern is less than or equal to a width of the first light-shielding pattern.

8. The display panel according to claim 3, wherein the plurality of color films with different colors comprise red color films, green color films, and blue color films, and wherein one of the red color films, one of the green color films, and one of the blue color films are sequentially disposed in adjacent three of the first intervals to form a pixel unit.

9. The display panel according to claim 8, wherein a number of the second intervals is equal to or less than a number of the pixel units.

10. The display panel according to claim 3, wherein the display panel further comprises thin film transistors disposed on the second substrate, and the thin film transistors and the light-shielding patterns are oppositely disposed.

11. The display panel according to claim 10, wherein the light-shielding member is disposed on a side of the thin film transistors away from the second substrate.

12. The display panel according to claim 11, wherein a material of the light-shielding member comprises a black matrix.

13. The display panel according to claim 10, wherein the light-shielding member is disposed in a same layer as at least one of a gate electrode or a source and drain electrode of the thin film transistors.

14. The display panel according to claim 10, wherein a width of the light-shielding member is greater than or equal to the second interval.

15. A display device comprising a display panel, the display panel comprising a first substrate, a second substrate disposed opposite to the first substrate, and liquid crystal molecules disposed between the first substrate and the second substrate, wherein the display panel further comprises:
   a first light-shielding layer disposed on the first substrate and comprising a plurality of light-shielding patterns, wherein at least one first interval is defined between the plurality of light-shielding patterns;
   a color film layer comprising a plurality of color films with different colors, wherein the plurality of color films with different colors are disposed in different ones of the first intervals respectively; and
   an anti-peep structure disposed between the first substrate and the second substrate, wherein the anti-peep structure comprises a portion of the light-shielding patterns and a portion of the liquid crystal molecules; and
   wherein the anti-peep structure further comprises a control member configured to control a deflection of the liquid crystal molecules positioned in the anti-peep structure, and when the display panel is in a non-anti-peep mode, the control member is configured to control the liquid crystal molecules in the anti-peep structure in an initial state, and light with a large viewing angle is blocked from transmitting through the display panel; when the display panel is in an anti-peep mode, the control member is configured to control the liquid crystal molecules in the anti-peep structure to deflect at a predetermined angle, and light with the large viewing angle transmits through the liquid crystal molecules and emits out from the display panel.

16. The display device according to claim 15, wherein at least one second interval is further defined between the plurality of light-shielding patterns, and wherein the plurality of light-shielding patterns comprise a plurality of first light-shielding patterns and a plurality of second light-shielding patterns, the first interval is defined between one of the first light-shielding patterns and one of the second light-shielding patterns adjacent to the first light-shielding pattern, and/or between adjacent two of the plurality of first light-shielding patterns, and the second interval is defined between adjacent two of the plurality of second light-shielding patterns.

17. The display device according to claim 16, wherein the anti-peep structure further comprises a light-shielding member disposed on the second substrate and opposite to the second interval.

18. The display device according to claim 17, wherein the display panel further comprises thin film transistors disposed on the second substrate, and the thin film transistors and the light-shielding patterns are oppositely disposed.

19. The display device according to claim 18, wherein the light-shielding member is disposed on a side of the thin film transistors away from the second substrate.

20. The display device according to claim 18, wherein the light-shielding member is disposed in a same layer as at least one of a gate electrode or a source and drain electrode of the thin film transistors.

* * * * *